United States Patent
Watt et al.

(10) Patent No.: US 10,125,848 B2
(45) Date of Patent: Nov. 13, 2018

(54) VARIATOR FOR WORK VEHICLE DRIVETRAIN

(71) Applicant: Deere & Company, Moline, IL (US)

(72) Inventors: Dwayne B. Watt, Bartlesville, OK (US); Cecil H. Wise, Jr., Coffeyville, KS (US); George W. Detrick, Coffeyville, KS (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 15/214,347

(22) Filed: Jul. 19, 2016

(65) Prior Publication Data

US 2018/0023672 A1     Jan. 25, 2018

(51) Int. Cl.
| | |
|---|---|
| *F16H 3/72* | (2006.01) |
| *A01D 69/00* | (2006.01) |
| *A01D 69/06* | (2006.01) |
| *B60K 6/00* | (2006.01) |
| *B60K 17/28* | (2006.01) |
| *A01D 46/08* | (2006.01) |

(52) U.S. Cl.
CPC .......... *F16H 3/725* (2013.01); *A01D 69/002* (2013.01); *A01D 69/005* (2013.01); *A01D 69/06* (2013.01); *B60K 6/00* (2013.01); *B60K 17/28* (2013.01); *F16H 3/724* (2013.01); *A01D 46/081* (2013.01); *A01D 46/085* (2013.01); *B60Y 2200/22* (2013.01)

(58) Field of Classification Search
CPC ....... F16H 3/725; A01D 69/005; A01D 69/06; A01D 69/002; B60K 6/00; B60K 17/28
See application file for complete search history.

(56) References Cited

U.S. PATENT DOCUMENTS

| | | | |
|---|---|---|---|
| 2,504,040 A | | 4/1950 | Orshansky, Jr. |
| 4,291,592 A | * | 9/1981 | Meyerle ................. F16H 47/04 |
| | | | 475/81 |

(Continued)

FOREIGN PATENT DOCUMENTS

| | | |
|---|---|---|
| DE | 112005003329 T5 | 5/2008 |
| DE | 102008008236 A1 | 8/2009 |

(Continued)

OTHER PUBLICATIONS

German Patent and Trade Mark Office, Search Report for German Patent Application No. 10 2017 210 188.1 dated Mar. 16, 2018.

(Continued)

*Primary Examiner* — Darlene P Condra
(74) *Attorney, Agent, or Firm* — Klintworth & Rozenblat IP LLP; Steven J. Wientrzny

(57) ABSTRACT

High efficiency work vehicle drivetrains containing variator assemblies are provided. In one embodiment, the work vehicle drivetrain includes an engine, a variator assembly, and an auxiliary power takeoff (PTO) shaft, which is coupled to the engine and rotatable about a primary power path axis when driven by the engine. The variator assembly includes, in turn, a variator motor and a variator gearbox. The variator gearbox contains a planetary gear system, which is coupled to the variator motor and to the auxiliary PTO shaft. The planetary gear system is rotatable about a planetary axis substantially parallel and offset from the primary power path axis.

19 Claims, 6 Drawing Sheets

(56) References Cited

U.S. PATENT DOCUMENTS

| | | | |
|---|---|---|---|
| 8,839,694 B2 | 9/2014 | Detrick et al. | |
| 8,888,645 B2* | 11/2014 | Xu | F16H 37/022 |
| | | | 475/207 |
| 8,944,194 B2 | 2/2015 | Glaser et al. | |
| 9,206,885 B2 | 12/2015 | Rekow et al. | |
| 2002/0011375 A1* | 1/2002 | Ishimori | A01B 71/06 |
| | | | 180/298 |
| 2003/0070848 A1* | 4/2003 | Hasegawa | B60K 17/06 |
| | | | 180/53.1 |
| 2004/0242090 A1* | 12/2004 | Gibbs | B60F 3/0007 |
| | | | 440/12.5 |
| 2005/0101425 A1* | 5/2005 | Yamauchi | B60K 6/365 |
| | | | 475/5 |
| 2005/0150326 A1* | 7/2005 | Daniel | A01B 71/06 |
| | | | 74/665 C |
| 2006/0148605 A1 | 7/2006 | Raghavan et al. | |
| 2006/0167713 A1* | 7/2006 | Johnson | B60K 17/28 |
| | | | 180/53.8 |
| 2007/0004547 A1* | 1/2007 | Ripamonti | F16H 47/04 |
| | | | 475/72 |
| 2015/0005131 A1* | 1/2015 | Gotz | B60K 6/387 |
| | | | 475/149 |
| 2015/0183436 A1 | 7/2015 | Rekow et al. | |
| 2015/0239343 A1 | 8/2015 | Janasek et al. | |
| 2015/0292608 A1 | 10/2015 | McKinzie | |
| 2015/0300471 A1 | 10/2015 | Love et al. | |
| 2016/0183467 A1* | 6/2016 | Goering | A01D 69/08 |
| | | | 477/6 |
| 2017/0248217 A1* | 8/2017 | Cronin | F16H 47/04 |
| 2017/0328452 A1* | 11/2017 | Janson | F16H 37/0846 |

FOREIGN PATENT DOCUMENTS

| | | |
|---|---|---|
| DE | 102012006189 A1 | 10/2013 |
| WO | 2006042434 A1 | 4/2006 |
| WO | 2013094029 A1 | 6/2013 |

OTHER PUBLICATIONS

German Patent and Trade Mark Office, Search Report for German Patent Application No. 10 2017 210 095.8 dated Mar. 15, 2018.

* cited by examiner

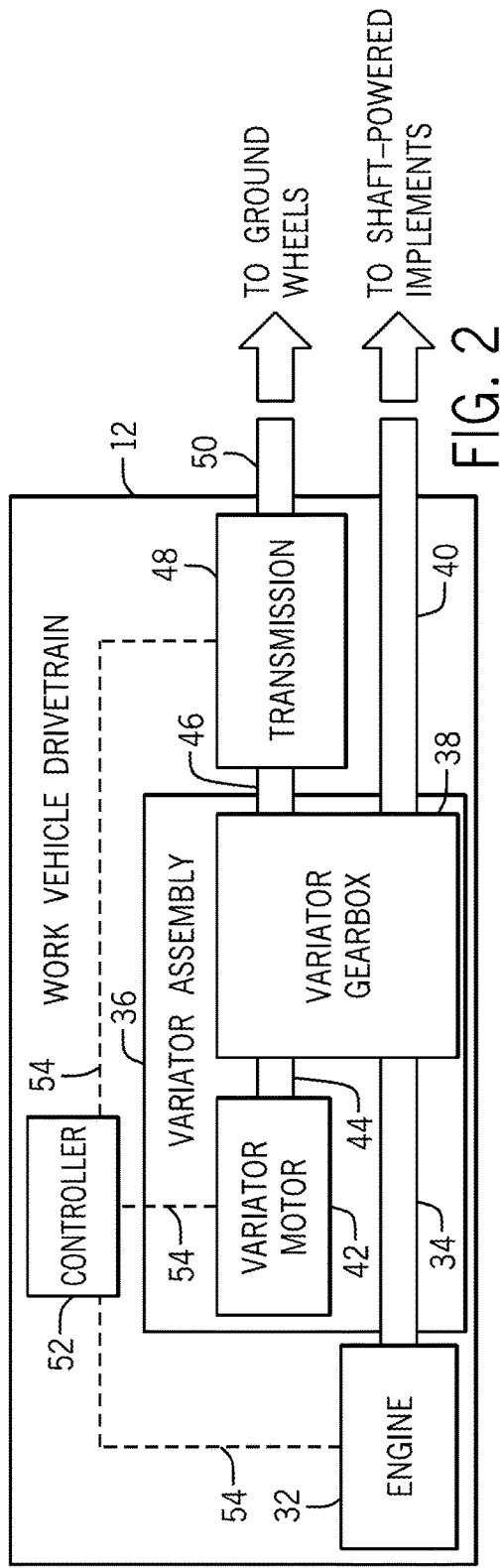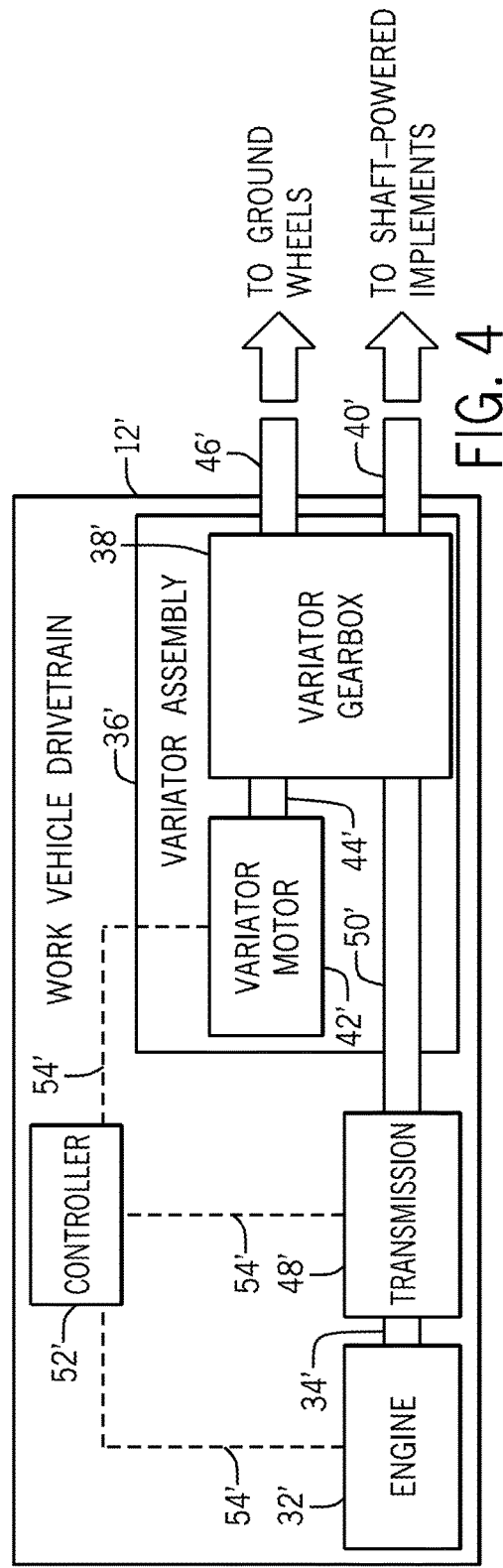

VARIATOR FOR WORK VEHICLE DRIVETRAIN

CROSS-REFERENCE TO RELATED APPLICATION(S)

Not applicable.

STATEMENT OF FEDERALLY SPONSORED RESEARCH OR DEVELOPMENT

Not applicable.

FIELD OF THE DISCLOSURE

This disclosure relates generally to work vehicles and, more particularly, to high efficiency work vehicle drivetrains containing variator gearboxes.

BACKGROUND OF THE DISCLOSURE

Work vehicles may be equipped with specialized tools or work implements designed to perform tasks useful in the agricultural, forestry, construction, mining, and other industries. When powered by a rotating shaft, the work implements are referred to herein as "shaft-powered implements." Examples of work vehicles having shaft-powered implements include cotton and sugarcane harvesters. Such harvesters may be equipped with forward-mounted row units containing movable, shaft-powered components, which pick, strip, or otherwise collect cotton fiber as the harvester travels over a field. The shaft-powered implements may be driven by an infinitely variable power source, such as a hydrostatic drive. The hydrostatic drive may include a hydrostatic motor, which is mechanically linked to the shaft-powered implements through an auxiliary power takeoff (PTO) shaft. By varying the output speed of the hydrostatic motor, the speed of the shaft-powered implements can be controlled. The ground speed of the work vehicle is further controlled utilizing a separate drivetrain, which may include a prime mover (e.g., internal combustion engine) linked to the ground wheels (or tracks) through a multi-speed transmission. Vehicle ground speed may thus be selected by varying the output speed of the engine or the gear ratio setting of the transmission, while the speed of the shaft-powered implements is independently adjusted to optimize implement performance. In the case of a cotton harvester, for example, the speed of the cotton stripper or picker units can be controlled to maximize the rate of cotton fiber collection independently of variations in the ground speed of the harvester.

SUMMARY OF THE DISCLOSURE

Embodiments of high efficiency work vehicle drivetrains containing variator assemblies are disclosed.

In one embodiment, the work vehicle drivetrain includes an engine, a variator assembly, and an auxiliary power takeoff (PTO) shaft, which is coupled to the engine and rotatable about a primary power path axis when driven by the engine. The variator assembly includes, in turn, a variator motor and a variator gearbox. The variator gearbox contains a planetary gear system, which is coupled to the variator motor and to the auxiliary PTO shaft. The planetary gear system is rotatable about a planetary axis substantially parallel and offset from the primary power path axis.

Variator assemblies are further provided. In one embodiment, the variator assembly includes a variator motor and a variator gearbox. The variator gearbox includes a gearbox housing to which the variator motor is mounted. A variator input shaft extends in the variator gearbox housing and is rotatable with respect thereto about a primary power path axis. A planetary gear system is further disposed within the variator gearbox housing, mechanically coupled to the variator motor and to the variator input shaft, and rotatable about a planetary axis substantially parallel to and offset from the primary power path axis. In an embodiment, the variator motor may include a variator motor input/output (I/O) shaft rotatable about an axis coaxial with the planetary axis. Additionally or alternatively, the planetary gear system may include (i) a ring gear through which the variator input shaft is mechanically coupled to the planetary gear system, as well as (ii) a sun gear through which the variator motor is mechanically coupled to the planetary gear system. In certain cases, the planetary gear system may further include (iii) a set of planet gears engaging the ring and sun gears, and (iv) a carrier supporting the set of planet gears and serving as a mechanical output of the planetary gear system. The variator assembly may still further include a rotatable output member, which is rotatable about the primary power path axis; and a coupler gear, which is rotatable about the planetary axis and mechanically coupling the carrier to the rotatable output member.

Embodiments of a variator gearbox are still further provided. In one embodiment the variator gearbox includes a gearbox housing, a variator input shaft extending in the variator gearbox housing and rotatable with respect thereto about a primary power path axis, and a planetary gear system disposed within the variator gearbox housing. The planetary gear system is rotatable about a planetary axis substantially parallel to and offset from the primary power path axis. In an implementation, the planetary gear system includes a ring gear through which the variator input shaft is mechanically coupled to the planetary gear system.

The details of one or more embodiments are set forth in the accompanying drawings and the description below. Other features and advantages will become apparent from the description, the drawings, and the claims.

BRIEF DESCRIPTION OF THE DRAWINGS

At least one example of the present disclosure will hereinafter be described in conjunction with the following figures, wherein like numerals denote like elements, and:

FIG. 2 is a schematic diagram illustrating a first example configuration of the dual output work vehicle drivetrain included in the work vehicle shown in FIG. 1;

FIG. 4 is a schematic diagram illustrating a second example configuration of the dual output work vehicle drivetrain included in the work vehicle shown in FIG. 1;

DETAILED DESCRIPTION

Figure 1:
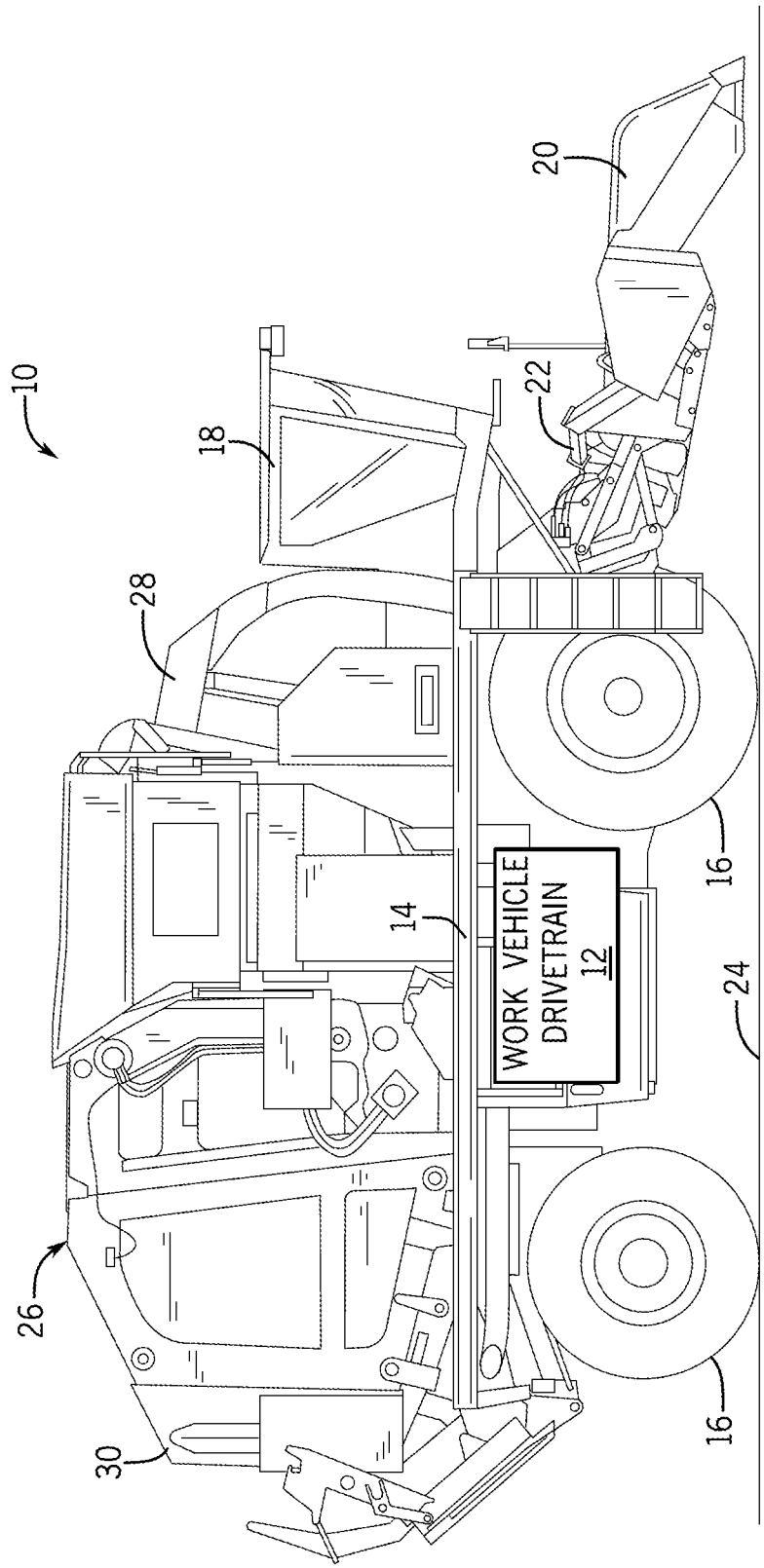
FIG. 1 is a side view of an example work vehicle (specifically, an example cotton stripper) including a dual output work vehicle drivetrain, as illustrated in accordance with an example embodiment of the disclosure.

The following describes one or more example embodiments of the disclosed work vehicle drivetrain and variator assembly, as shown in the accompanying figures of the drawings described briefly above. Various modifications to the example embodiment(s) may be contemplated by one of skill in the art.

As briefly described above, certain work vehicles are equipped with specialized implements powered by a hydrostatic drive through an auxiliary Power Takeoff (PTO) shaft. The ground speed of the work vehicle may be controlled by a separate drivetrain system including a prime mover (e.g., internal combustion engine) and a multi-speed transmission. Such a "dual output" drivetrain provides separate power outputs for the shaft-powered implements and the work vehicle ground wheels in a manner enabling independent speed selection of the implements relative to the ground speed of the vehicle. This advantage notwithstanding, dual output work vehicle drivetrains of this type may be limited in certain respects. For example, such dual output work vehicle drivetrains may require relatively large hydrostatic drives to satisfy the power demands of the shaft-powered implements. As hydrostatic drives tend to be relatively inefficient devices, reliance upon a relatively large hydrostatic drive may reduce overall work vehicle efficiency appreciably in some cases. Additionally, large hydrostatic drive components (e.g., a sizable hydrostatic pump, a high power output hydrostatic motor, associated plumbing, and so on) can add undesired cost, weight, and bulk to the work vehicle drivetrain. Conventional dual output work vehicle drivetrains may rely exclusively upon variations in engine output speed and changes in gear ratio settings of the multi-speed transmission to effectuate desired adjustments in vehicle ground speed. Such work vehicle drivetrains may consequently provide only stepped speed selection (rather than non-stepped or infinite speed selection) within the working ground speed range of the work vehicle.

The following describes embodiments of a highly efficient dual output work vehicle drivetrain well-suited for usage within a work vehicle equipped with shaft-powered implements. As indicated by the term "dual output," the work vehicle drivetrain includes at least two mechanical outputs: (i) a ground wheel output through which the work vehicle is propelled, and (ii) an auxiliary PTO shaft through which shaft-powered implements are driven. In addition to these mechanical outputs, the dual output work vehicle drivetrain includes a prime mover and a variator motor. In contrast to work vehicle drivetrains of the type described above, the prime mover is utilized to drive rotation of the auxiliary PTO shaft and the shaft-powered implements, while further providing a baseline power output to the ground wheels of the work vehicle. The variator motor likewise contributes a controlled power output to the ground wheel output to further drive the ground wheels over at least a portion the ground speed range of the work vehicle. Such an arrangement allows the size and power requirements of the variator motor (e.g., a hydrostatic drive motor, an electric motor, or another infinitely variable power source) to be reduced as compared to relatively large hydrostatic drives of the type previously described. The overall efficiency of the work vehicle drivetrain is improved as a result. Furthermore, in certain embodiments of the dual output work vehicle drivetrain, the variator motor may be controlled to compensate for, or linearize, the stepped gear ratio settings provided by the multi-speed transmission. In this manner, a non-stepped or infinitely variable power output can be provided for powering the ground wheels over at least a majority and, possibly, over the substantial entirety of the working ground speed range of the work vehicle. Additionally, such a control scheme may allow the prime mover to operate at a substantially constant output speed over the substantial entirety of the working ground speed range to further improve work vehicle efficiency.

Embodiments of the dual output work vehicle drivetrain include a specialized gearbox (referred to herein as a "variator gearbox") through which the variator motor is mechanically linked to the ground wheel output of the work vehicle drivetrain. During drivetrain operation, the variator gearbox sums the power output of the variator motor ($PO_{VM}$) with a fractional power output of the prime mover ($PO_{\%PM}$) and applies this summed power ($PO_{VM}+PO_{\%PM}$) to a mechanical output of the gearbox (hereafter the "primary gearbox output"). The variator gearbox may also permit reverse-driving of the variator motor under certain operational conditions, such as during an initial speed range of selected gear ratio settings of the multi-speed transmission. The variator gearbox can contain any number of components, component types, and gearing configurations suitable for performing such functions. It may be particularly advantageously, however, to integrate or incorporate at least one planetary gear system into the variator gearbox. For example, in one embodiment, the variator gearbox may contain a planetary gear system rotatable about a planetary axis that is parallel to, but offset from the primary power path axis about which the variator input shaft and the auxiliary PTO shaft rotate. Such a gearbox configuration (referred to hereafter as an "split power path variator gearbox") usefully provides a relatively simple, structurally robust mechanism for selectively allowing an additive power flow from the variator motor when forward-driven and a regenerative power flow to the variator motor when reverse-driven. An example of such a split power path variator gearbox is described more fully below in conjunction with FIGS. 5-7. First, however, embodiments of the dual output work vehicle drivetrain are described in conjunction with FIGS. 1-4 to provide an illustrative context in the split power path variator gearbox may be better understood. While primarily described below in conjunction with a particular type of work vehicle (a harvester), it will be appreciated that embodiments of the split power path variator gearbox and, more generally, the dual output work vehicle drivetrain can be utilized in conjunction with various other types of work vehicles equipped with shaft-powered implements.

FIG. 1 is a side view of a cotton harvester 10 containing a dual output work vehicle drivetrain 12, as illustrated in accordance with an example embodiment of the present disclosure. In this particular example, the cotton harvester 10 is depicted as a cotton stripper, but could readily assume the form of a cotton picker or a sugarcane harvester in alternative implementations. The cotton harvester 10 includes a wheeled chassis 14, a number of ground-engaging wheels 16 rotationally mounted to the chassis 14, and an operator cabin 18 supported by a forward portion of the chassis 14. The cotton harvester 10 also includes one or more shaft-powered implements and, specifically, a row of stripper units 20 for collecting cotton fiber as the cotton harvester 10 travels over a cotton field 24. The row of stripper units 20 is mounted to a forward portion of the chassis 14 by a control arm assembly 22. Although only a single stripper unit 20 can be seen in the side view of FIG. 1, the cotton harvester 10 will typically include multiple (e.g., 6 to 8) stripper units arranged in a laterally extending, side-by-side relationship. The individual stripper units each include movable components (e.g., rotating augers or oscillating blades) designed to collect cotton fiber from cotton plants. As the cotton harvester 10 travels across the cotton field 24 and the stripper units 20 gather cotton fiber, a non-illustrating conveyance system (e.g., a pressurized air system) delivers the cotton fiber into a module builder 26 mounted to the chassis 14. The gathered cotton fiber is bundled into a cylindrical bale or "cotton module" as the fiber progress from a forward portion 28 to an aft portion 30 of the module builder 26. The cotton module is then ejected through an opening in the aft portion 30 of the module builder 26 for subsequent collection and transport.

As indicated above, it may be desirable to independently control the operational speed of the stripper units 20 relative to the ground speed of the cotton harvester 10. For example, in one control scheme or operational mode, the stripper units 20 are driven at a substantially constant speed, while the ground speed of the cotton harvester 10 is selectively adjusted by an operator utilizing controls located within the operator cabin 18. In other control schemes or operational modes, the speed of the stripper units 20 may be varied during operation of the work vehicle in response to operator input commands, variations in the work vehicle ground speed, changes in operational parameters of the cotton harvester 10, changes in environmental conditions, and other such factors. The dual output work vehicle drivetrain 12 provides a highly efficient mechanism for powering both the stripper units 20 and the ground wheels 16 of the cotton harvester 10, while further supporting independent speed selection of the stripper units 20 relative to the harvester ground speed. As an additional benefit, embodiments of the dual output work vehicle drivetrain 12 provide a non-stepped or infinitely variable ground speed selection over at least the majority and, perhaps, the substantial entirety of the ground speed range of the cotton harvester 10. One manner in which the dual output work vehicle drivetrain 12 is able to provide such beneficial characteristics will now be discussed in conjunction with FIGS. 2-4.

Advancing to FIG. 2, an example embodiment of the dual output work vehicle drivetrain 12 is illustrated schematically in greater detail. As can be seen, the work vehicle drivetrain 12 includes a prime mover, such as an engine 32, and a variator assembly or system 36. The prime mover will often assume the form of an internal combustion engine, but can be any motor, engine, or device suitable for converting stored energy (e.g., in the form of liquid fuel) into shaft rotation. A mechanical output of the engine 32 is coupled to a first mechanical input of the variator assembly 36 by way of a rotating mechanical connection 34. Specifically, the variator assembly 36 contains a variator gearbox 38, and the rotating mechanical connection 34 transmits rotary motion to a first mechanical input of the variator gearbox 38. As schematically illustrated in FIG. 2, the rotating mechanical connection 34 may be representative of an output shaft of the engine 32, an input shaft of the variator assembly 36, and/or any number of intervening components suitable for transmitting rotational motion from the mechanical output of the engine 32 to a mechanical input of the variator assembly 36.

The dual output work vehicle drivetrain 12 further contains an auxiliary PTO shaft 40, which extends from the variator gearbox 38. The auxiliary PTO shaft 40 is mechanically coupled to the mechanical output of the engine 32. In one embodiment, the output shaft of the engine 32 may be mechanically linked to the auxiliary PTO shaft 40 in a rotationally-fixed relationship. The mechanical coupling between the output shaft of the engine 32 and the auxiliary PTO shaft 40 can be, for example, a splined coupling located within the variator gearbox 38, as described more fully below in conjunction with FIGS. 5-6. In this case, the output shaft of the engine 32 and the auxiliary PTO shaft 40 rotate in a 1:1 relationship. In other embodiments, the engine output shaft and the auxiliary PTO shaft 40 may be integrally formed as a single piece. Alternatively, the engine output shaft and the auxiliary PTO shaft 40 may be linked through gearing or another rotational coupling such the engine output shaft and the auxiliary PTO shaft 40 rotate in a fixed proportional relationship other than a 1:1 relationship. As indicated in the lower right corner of FIG. 2, the auxiliary PTO shaft 40 serves a final mechanical output of the dual output work vehicle drivetrain 12, which animates the shaft-powered implements of the work vehicle. The auxiliary PTO shaft 40 can be mechanically linked to the work vehicle's shaft-powered implements, such as the stripper units 20 of the cotton harvester 10 shown in FIG. 1, utilizing any suitable mechanical coupling or arrangement.

In addition to the variator gearbox 38, the variator assembly 36 further includes a variator motor 42. The variator motor 42 can be any infinitely variable power source including, but not limited to, an electric motor or a hydrostatic drive motor. A rotating mechanical connection 44 mechanically links the variator motor 42 to the variator gearbox 38. The rotating mechanical connection 44 can be provided by a variator motor shaft projecting from the variator motor 42, by a shaft projecting from the variator gearbox 38, and/or by any number of intervening components suitable for transmitting rotary motion between the respective mechanical inputs and outputs of the variator motor 42 and the variator gearbox 38. In certain embodiments, the variator motor 42 may be capable of being either forward-driven or reverse-driven through the variator gearbox 38, depending upon the operational conditions of the dual output work vehicle drivetrain 12. In embodiments wherein the variator motor 42 can be either forward-driven or reverse-driven, the variator motor may be referred as including a "variator motor input/output (I/O) shaft," while the variator gearbox 38 may be referred to as including a mechanical I/O to which the variator motor I/O shaft is mechanically coupled. Such an arrangement allows excess power supplied by the engine 32 to be absorbed by the variator motor 42 (and other associated devices) in certain control regenerative schemes, as described more fully below. The following description notwithstanding, the variator motor 42 need not accept reverse-driving in all embodiments the work vehicle drivetrain 12.

During operation of the work vehicle drivetrain 12, the variator gearbox 38 functions to sum the power output of the variator motor 42 ($PO_{VM}$) with a fraction of the power output of the engine 32 ($PO_{\%PM}$) drawn from the rotating mechanical connection 34. The power output of the variator motor ($PO_{VM}$) may be considered positive when the variator motor 42 is forward-driven and negative when the variator motor 42 is reverse-driven. The variator gearbox 38 then applies this summed power ($PO_{VM}+PO_{\%PM}$) to a multi-speed (e.g., powershift) transmission 48 through a rotating mechanical connection 46. The rotating mechanical connection 46 may be realized in the form of a variator gearbox output (e.g., a rotating shaft, adapter piece, or other mechanical output of the variator gearbox 38), a transmission input shaft, and/or any number of intervening components or devices. When driven through the rotating mechanical connection 46, the multi-speed transmission 48 converts rotation of the primary gearbox output to rotation of a transmission output shaft 50. In the illustrated example, the transmission output shaft 50 serves as the final ground wheel output of the work vehicle drivetrain 12. Accordingly, the transmission output shaft 50 is further mechanically linked to the ground wheels of the work vehicle through additional mechanical connections or devices, which are not shown in FIG. 2 to avoid unnecessary obscuring the drawing.

With continued reference to FIG. 2, the dual output work vehicle drivetrain 12 further includes at least one controller 52. As schematically represented by control lines 54, the controller 52 is operably coupled to the engine 32, to the variator motor 42, and to the transmission 48 in a manner enabling the controller 52 to transmit command signals to and/or receive (e.g., sensor) signals from these components or devices to support operation of the work vehicle drivetrain 12. The control lines 54 may represent hardline or wired connections, wireless signal connections, or a combination thereof. Although illustrated schematically as a single block in FIG. 2, the controller 52 can include or assume the form of any electronic device, subsystem, or combination of devices suitable for performing the processing and control functions described herein. In this regard, the controller 52 may be implemented utilizing any suitable number of individual microprocessors, memories, power supplies, storage devices, interface cards, and other standard components known in the art. Additionally, the controller 52 may include or cooperate with any number of software programs or instructions designed to carry-out various methods, process tasks, calculations, and control functions described herein. The controller 52 may further include or function in conjunction with a memory containing any number of volatile and/or non-volatile memory elements.

During operation of the work vehicle drivetrain 12, the controller 52 commands the variator motor 42 to modify the rotational speed of the variator motor I/O shaft. The controller 52 modifies the output speed of the variator motor 42 to rotate the transmission output shaft 50 at a speed providing a desired output power to the ground wheels and, therefore, a desired ground speed of the work vehicle. The controller 52 may also regulate the speed of the engine 32, or engine speed may be controlled by a separate engine controller. The controller 52 may modify the speed of the variator motor 42 as a function of the engine output speed, the current gear ratio setting of the multi-speed transmission 48, and other operational parameters as appropriate to achieve the desired rotational speed at the transmission output shaft 50. In one embodiment, and by way of non-limiting example only, the controller 52 varies the speed of the variator motor 42 to linearize or, more informally, "smooth out" the stepped gear ratio settings of the multi-speed transmission 48 and thereby yield an infinitely variable power output at the transmission output shaft 50. Stated differently, the controller 52 varies the speed of the variator motor 42 to reduce (and effectively eliminate) stepped changes in the speed of the ground wheel output as the multi-speed transmission 48 transitions between successive gear ratio settings. By executing such a control scheme utilizing the controller 52, an infinite ground speed selection can be provided across the working ground speed range of the work vehicle (e.g., the cotton harvester 10 shown in FIG. 1) despite the inclusion of the multi-speed transmission 48 within the work vehicle drivetrain 12. A non-limiting example of such a control scheme will now be described in greater detail in conjunction with FIG. 3.

Figure 3:
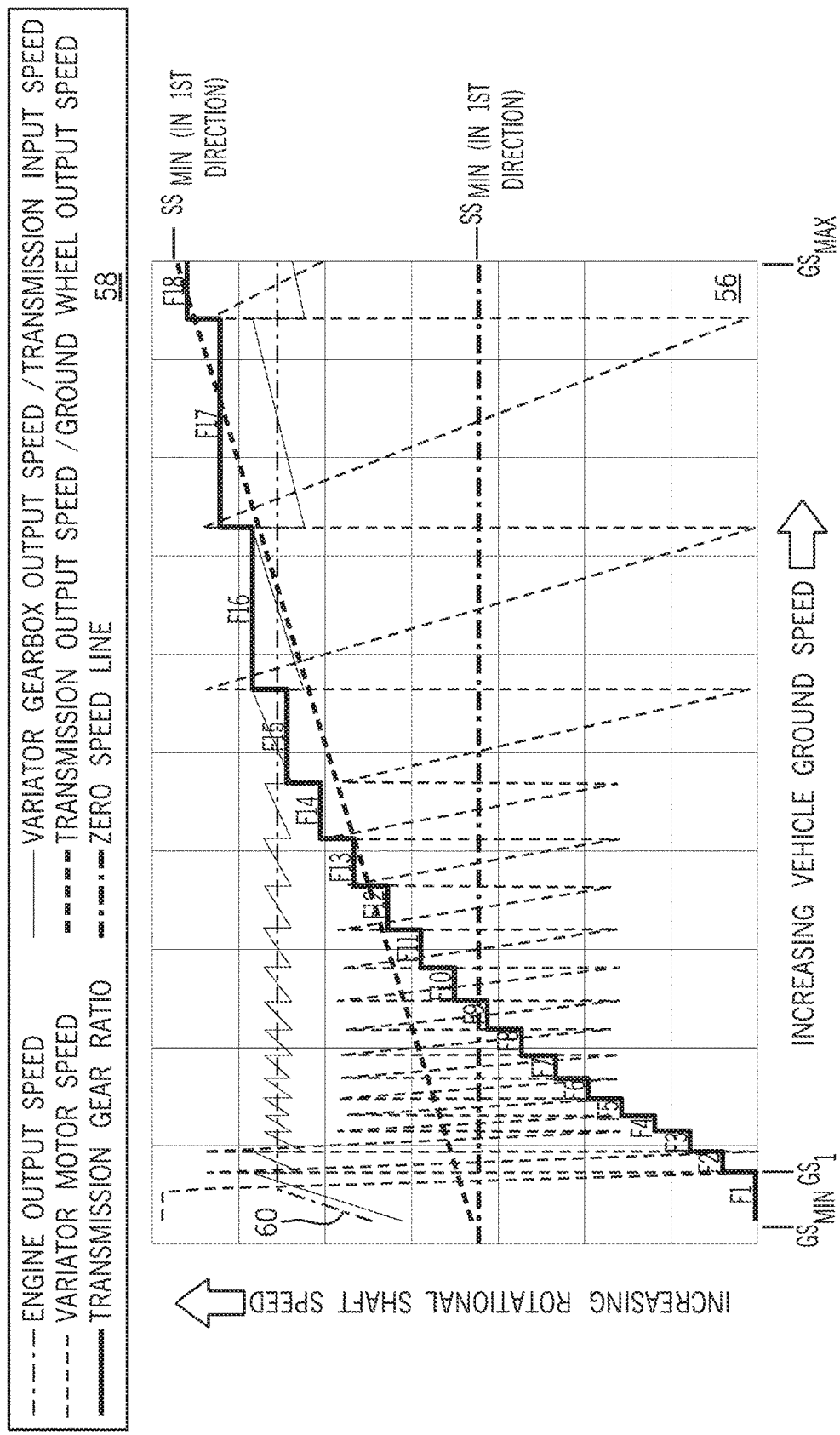
FIG. 3 is a graph of ground speed (abscissa) versus rotational shaft speed (ordinate) illustrating one manner in which the dual output work vehicle drivetrain may provide a non-stepped or infinitely variable power output over the ground speed range of a work vehicle in an embodiment.

FIG. 3 is a graph 56 illustrating a control scheme that can be carried-out by the controller 52 of the dual output work vehicle drivetrain 12 (FIG. 2) in a further example embodiment of the present disclosure. Increasing work vehicle ground speed is plotted along the abscissa or horizontal axis of the graph 56, while increasing shaft speed is plotted along the ordinate or vertical axis thereof. Several traces or characteristics are plotted on the graph 56. As labeled in a key 58 appearing in an upper portion of FIG. 3, these traces or characteristics include: (i) an engine output speed characteristic, (ii) a variator motor speed characteristic, (iii) a variator gearbox output speed characteristic (also representative of the transmission input speed in the embodiment of FIGS. 2-3), and (iv) a transmission output speed characteristic (also representative of the final ground wheel power output in the embodiment of FIGS. 2-3). As further identified in the key 58, the stepped line overlaid onto the graph 56 represents the discrete gear ratio settings of the multi-speed transmission 48. In this particular example, the multi-speed transmission 48 is a powershift transmission including eighteen gear ratio settings, which are identified as "$F_1$-$F_{18}$." In other embodiments, the number of gear ratio settings provided by the transmission 48 and the relative characteristic of the gear ratio settings may vary. Finally, the dashed vertical line extending across a mid-portion of the graph represents the zero speed line. Below the zero speed line, the appearance of the variator motor speed characteristic denotes reverse-driving of the variator motor 42 (FIG. 2) and regenerative operation of the work vehicle drivetrain.

As expressed in the graph 56 shown in FIG. 3, the transmission output speed characteristic is represented by a linear trace having a positive slope, which is substantially constant over the graphed vehicle ground speed range. The transmission output speed characteristic progresses in a relatively gradual or non-stepped manner from a minimum shaft speed (identified as "$SS_{MIN}$"; approximately zero) to a maximum shaft speed (identified as "$SS_{MAX}$"), as taken in a first rotational direction corresponding to forward motion of the work vehicle. A non-stepped or infinitely variable power output is consequently provided over the speed selection for transmission output speeds between $SS_{MIN}$ and $SS_{MAX}$. As the transmission output speed corresponds to the speed of the primary gearbox output in the embodiment of FIGS. 2-3, this likewise provides a non-stepped or infinitely variable power output over the ground speed range of the work vehicle. In the example of FIG. 3, the ground speed range of the work vehicle ranges from a minimum ground speed (identified as "$GS_{MIN}$") to a maximum ground speed (identified as "$GS_{MAX}$"), exclusive of any reverse gear settings. In one embodiment, the ground speed range of the work vehicle is 0 to 20 mile per hour (MPH) such that $GS_{MIN}$=0 MPH, while $GS_{MAX}$=20 MPH. In other embodiments, the ground speed range of the work vehicle may be greater than or less than the aforementioned range.

The infinitely variable power output provided at the transmission output shaft 50 (FIG. 1) is achieved despite the discrete, stepped gear ratio settings of the multi-speed transmission 48. This is due, in part, to the manner in which the variator gearbox 38 applies to the multi-speed transmission 48 (FIG. 2) the power output of the variator motor 42 as summed with a fractional power output of the engine 32. Additionally, in accordance with the example control scheme shown graphically in FIG. 3, the controller 52 modulates the speed of the variator motor 42 in a manner compensating for and effectively linearizing the stepped speed output of the transmission 48. This may be appreciated by comparing the relationship between the stepped gear ratio settings $F_2$-$F_{18}$ of the multi-speed transmission 48 relative to the variator motor output speed over the working ground speed range of the work vehicle. As can be seen, the variator motor 42 first accepts reverse-driving over an initial portion (a lower ground speed range) of each gear ratio setting $F_2$-$F_{18}$. When reverse-driven in this manner, the variator motor 42 (and other associated components) is advantageously configured to absorb the excess power output drawn from the engine 32 ($PO_{\%PM}$) through the rotating mechanical connection 34 (FIG. 2) to allow the drivetrain to temporarily operate in a regenerative state. In this regard, the variator motor 42 (and other associated components) may convert the rotary movement transmitted to the motor 42 to electrical energy, which is then stored or later utilized to optimize the efficiency of the work vehicle drivetrain 12. As the work vehicle ground speed increases toward a latter portion (a higher ground speed range) of each gear ratio setting $F_2$-$F_{18}$, the controller 52 (FIG. 2) controls the variator motor 42 to gradually increase or "ramp-up" the output speed of the variator motor I/O shaft. A substantially linear, infinitely variable power output is consequently produced over the operational range of the work vehicle drivetrain 12.

In certain embodiments of the work vehicle drivetrain 12, the engine 32 may provide a substantially constant speed output over the majority of the ground speed range of the work vehicle. In this regard, and as further indicated in the graph 56 (FIG. 3), the engine 32 can be controlled to provide a substantially constant output speed over the substantial entirety of the working ground speed range from a first relatively low ground speed (identified as "$GS_1$" in FIG. 3) to a second higher speed (equivalent to $GS_{MAX}$ in FIG. 3). In one embodiment, and by way of non-limiting example only, $GS_1$ may be approximately 1 MPH. At vehicle ground speeds exceeding $GS_1$, the linear nature of the ground wheel output characteristic may be created by controlling the variator motor 42 in relation to the gear ratio settings of the multi-speed transmission 48 ($F_2$-$F_{18}$) in the previously-described manner. Conversely, at ground speeds below $GS_1$, the transmission 48 remains at a single gear ratio setting ($F_1$), and the linear nature of the ground wheel output characteristic is achieved simply by varying the output speed of the engine 32 (FIG. 2), as indicated by an initial segment 60 of the engine output speed characteristic. The variator motor 42 may contribute to a substantially constant power output during this initial ground speed range ($GS_{MIN}$ to $GS_1$). In other embodiments, a different control scheme may be implemented utilizing the dual output work vehicle drivetrain 12 (FIG. 2) such that the output speed of the variator motor 42 may be modulated over a greater or lesser portion of the working ground speed range of the work vehicle.

By maintaining the engine output speed at a substantially constant speed over the majority and, perhaps, over the substantial entirety of the work vehicle's working ground speed range, the efficiency of the dual output work vehicle drivetrain 12 can be enhanced, while control scheme complexity is reduced. In other embodiments, the engine speed may not be held substantially constant across the working ground speed range of the work vehicle. In either case, the variator motor 42 need only provide a relatively modest power contribution, as appropriate to transform the stepped gear ratios of the transmission 48 into a substantially linear, infinitely variable power output over the majority of the ground speed range of the work vehicle. The operational requirements (e.g., power demands) placed on the variator motor 42 are thus minimized, which allows the variator motor size, weight, and inefficiency contributions to be reduced. Thus, even when assuming the form of a hydrostatic drive motor, the variator motor size can be minimized as compared to relatively large hydrostatic drive motors of the type conventionally utilized within dual output work vehicle drivetrains. The efficiency of the dual output work vehicle drivetrain 12 is improved as a result, while the cost, size, and complexity of drivetrain 12 are reduced. The foregoing example notwithstanding, the output speed of the variator motor 42 may be controlled in a different manner in further embodiments of the work vehicle drivetrain 12. For example, in an alternative embodiment, the output speed of the variator motor 42 may be controlled such that the ground wheel power output of the work vehicle drivetrain 12 is linearized over only a portion of the working ground speed range of the work vehicle.

There has thus been described an example embodiment of a highly efficient dual output work vehicle drivetrain well-suited for incorporation into work vehicles equipped with shaft-powered implements, such as cotton and sugarcane harvesters. The above-described dual output work vehicle drivetrain is provided by way of non-limiting example only. Various modifications can be made to the work vehicle drivetrain without departing from the scope of the invention, as set-forth in the appended Claims. For example, in the embodiment of the work vehicle drivetrain 12 shown in FIG. 2 the variator gearbox 38 is positioned mechanically upstream of the multi-speed transmission 48; however, this need not be the case in all embodiments. Instead, in further embodiments, the variator gearbox may be positioned mechanically downstream of the multi-stepped transmission. In this case, the primary gearbox output (rather than the output shaft of the multi-speed transmission) may serve as the final ground wheel output of the work vehicle drivetrain. An example of such an alternative implementation of the work vehicle drive train will now be described more fully below in conjunction with FIG. 4.

FIG. 4 illustrates schematically a dual output work vehicle drivetrain 12', as depicted in accordance with a further example embodiment of the present disclosure. The dual output work vehicle drivetrain 12' is similar to the dual output work vehicle drivetrain 12 shown in FIG. 2; thus, like reference numerals are utilized to denote like structural features or devices, but with the addition of a prime (') symbol to indicate that such features or devices may vary to certain extents. As was previously the case, the work vehicle drivetrain 12' includes a variator assembly 36' containing a variator gearbox 38', a variator motor 42', and a rotating mechanical connection 44' mechanically linking the variator gearbox 38' to the I/O shaft of the variator motor 42'. An auxiliary PTO shaft 40' projects from the variator gearbox 38' and serves as a first mechanical output of the dual output work vehicle drivetrain 12' for driving the shaft-powered implements. Once again, the variator gearbox 38' is mechanically coupled in series with an engine 32' and a multi-speed transmission 48'. However, in this particular example, the variator gearbox 38' is positioned mechanically downstream of the multi-speed transmission 48'. Specifically, the variator gearbox 38' is mechanically linked to the multi-speed transmission 48' by a rotating mechanical connection, which may be representative of an output shaft of the transmission 48', an input shaft of the variator gearbox 38', and/or any number of intervening components or connections. Additionally, the output shaft of the variator gearbox 38' (rather than the output shaft of the transmission 48)

now serves as the final primary gearbox output of the work vehicle drivetrain 12'. These differences notwithstanding, the output speed of the variator motor 42' can still be controlled (e.g., by issuing appropriate commands from the controller 52') in essentially the same manner as described above in conjunction with FIG. 3, if so desired. In particular, the output speed of the variator motor 42' can be controlled to transform the discrete, stepped gear ratio settings of the multi-speed transmission 48' into a non-stepped, infinitely variable power output (as applied to the primary gearbox output 46') for driving the work vehicle ground wheels.

Multiple example embodiments of a highly efficient work vehicle drivetrain have been provided, which enable independent ground speed selection of a work vehicle (e.g., over an infinitely selectable ground speed range) relative to the speed of one or more shaft-powered implements carried by the work vehicle. In each of the above-described example embodiments, the work vehicle drivetrain utilized a variator gearbox to mechanically sum the power output of a variator motor with a fractional power output of a prime mover (e.g., an internal combustion engine) and then apply this summed power to an output shaft of the gearbox. As previously emphasized, the variator gearbox can assume various different forms and contain a wide variety of gearing combinations suitable for performing such functions. Certain benefits may be achieved, however, through the usage of a so-called "split power path variator gearbox"; that is, a variator gearbox containing a planetary gear system rotatable about a planetary axis that is parallel to, but offset from the primary power path axis about which the variator input shaft and the auxiliary PTO shaft rotate. An example of such a split power path variator gearbox will now be described in conjunction with FIGS. 5-7.

Figure 5:
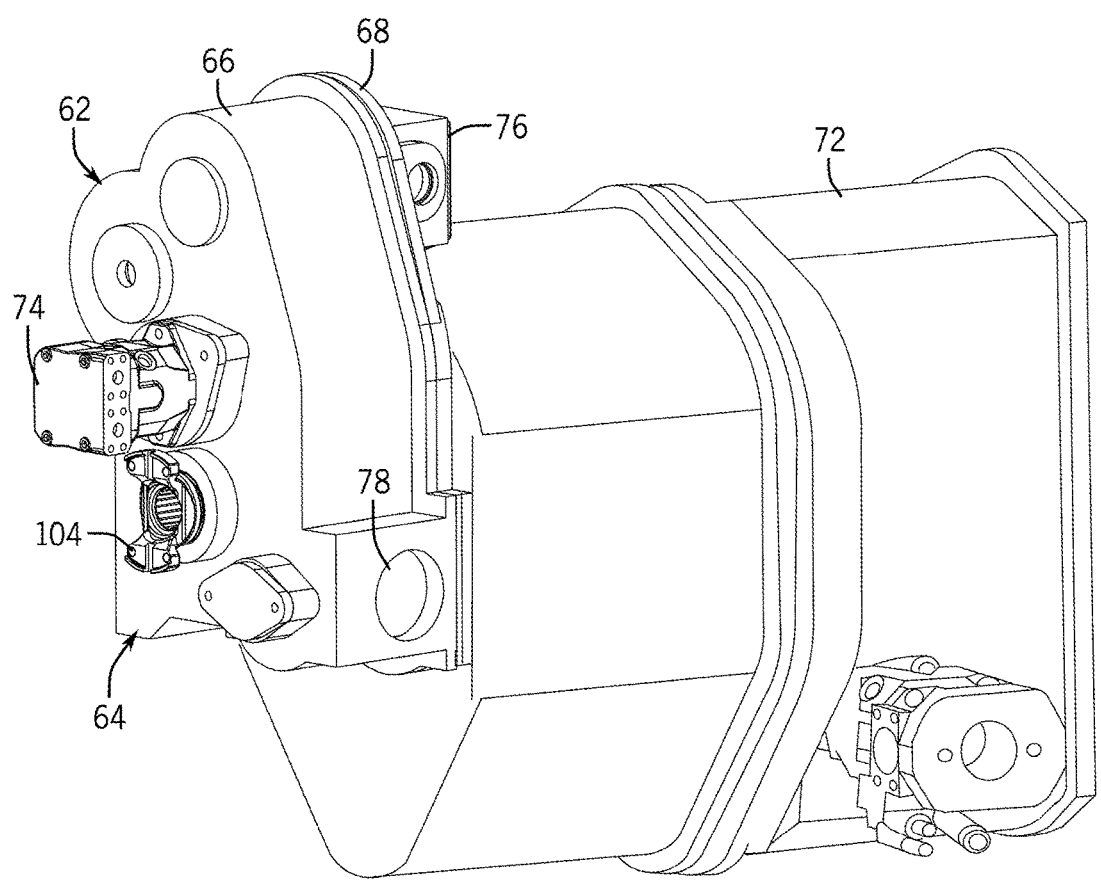
FIG. 5 is an isometric view of a split power path variator gearbox, a variator, and a multi-speed transmission that may be included in embodiments of the dual output work vehicle drivetrain shown in FIGS. 2 and 4, as illustrated in accordance with a further example embodiment of the present disclosure.
Figure 6:
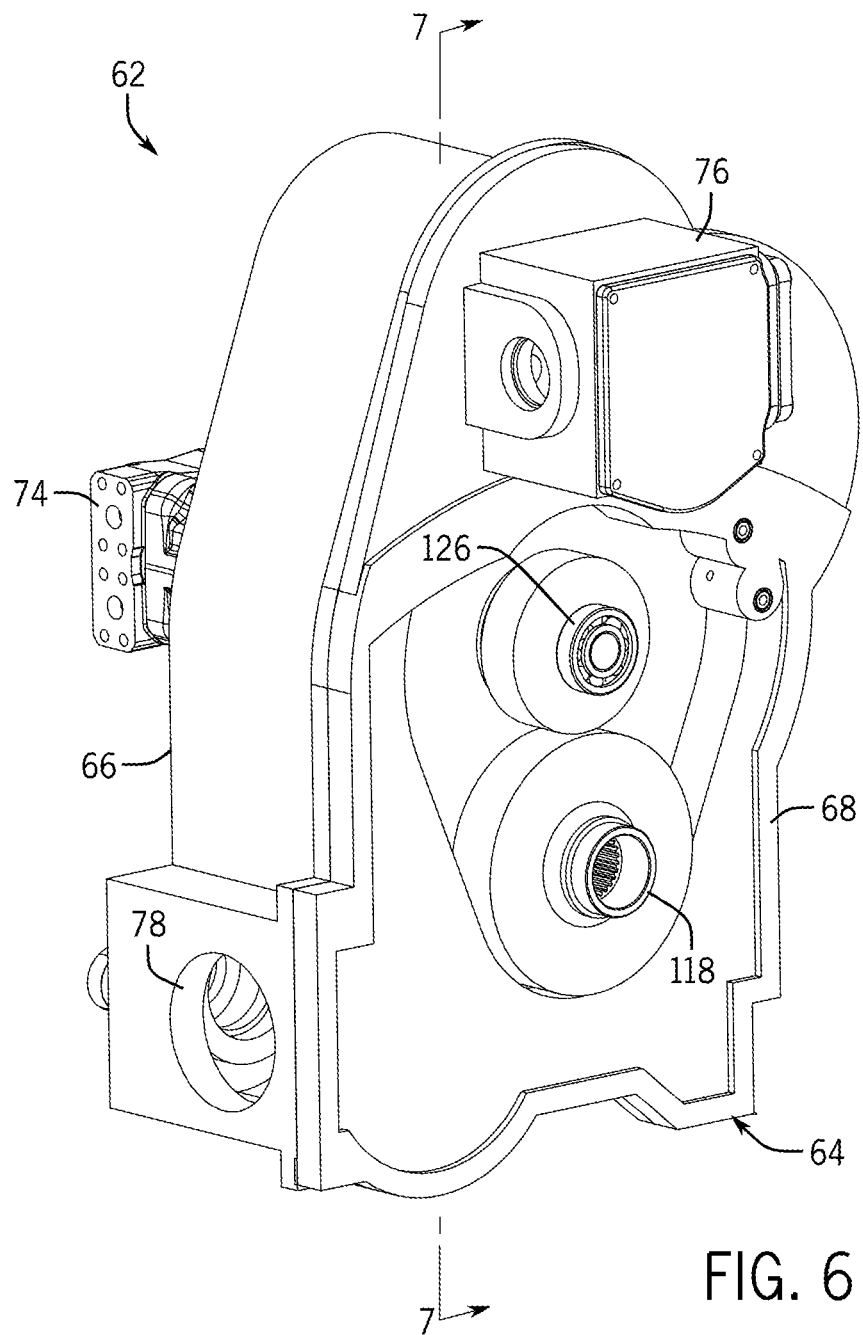
FIGS. 6 and 7 are rear isometric and cross-sectional views, respectively, of the example split power path variator gearbox shown in FIG. 5 and containing a planetary gear system, which is rotatable about a planetary axis parallel to and offset from a primary power path axis.
Figure 7:
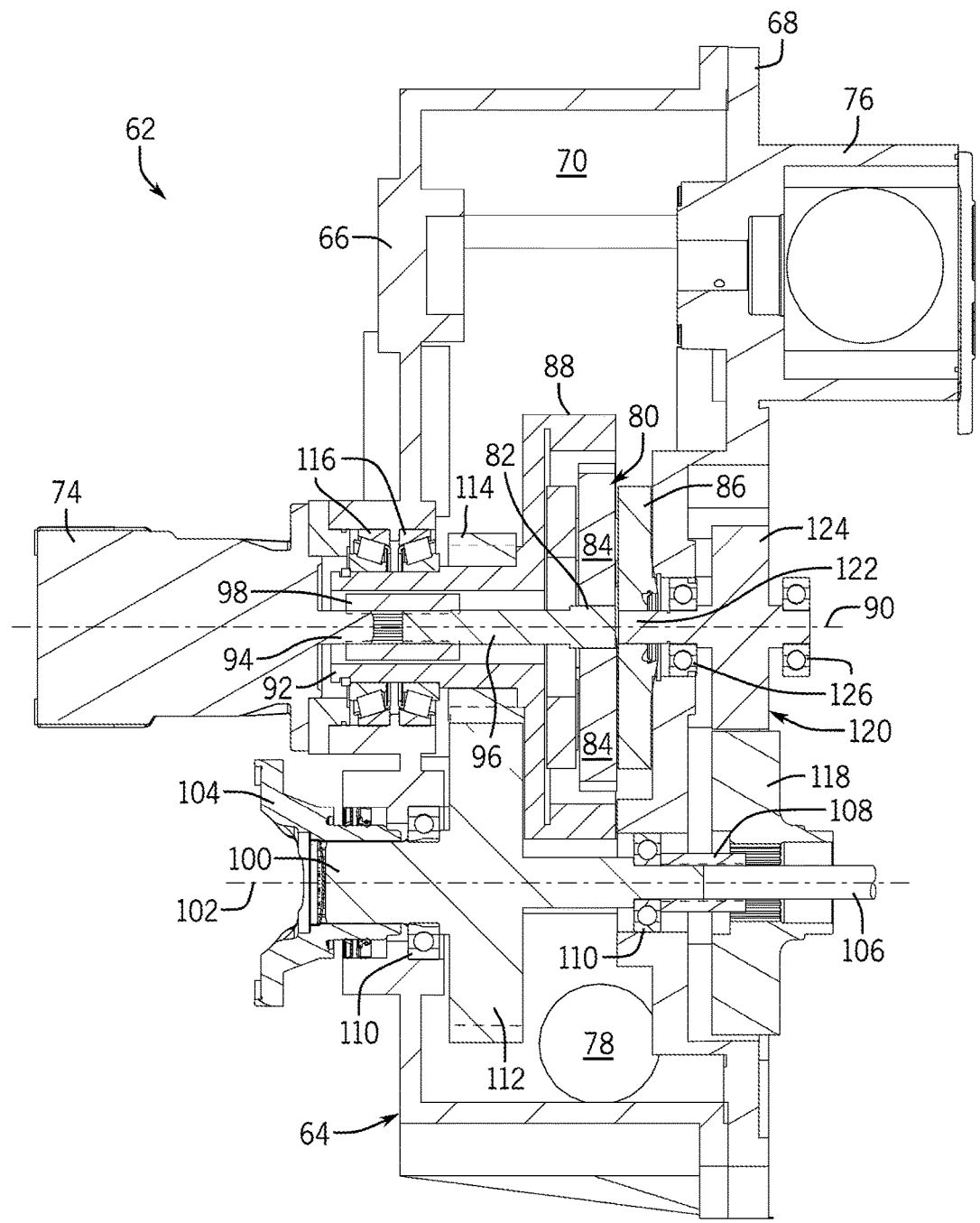

FIGS. 5, 6, and 7 are front isometric, rear isometric, and cross-sectional views, respectively, of a split power path variator gearbox 62, as illustrated in accordance with a further example embodiment of the present disclosure. The split power path variator gearbox 62 is well-suited for usage as the variator gearbox 38 of the work vehicle drivetrain 12 described above in conjunction with FIG. 2 and will consequently be described below with occasional reference to the work vehicle drivetrain 12. This notwithstanding, it will be appreciated that the following description is provided by way of non-limiting example only and that the split power path variator gearbox 62 can be utilized within other types of dual output work vehicle drivetrains. Referring collectively to FIGS. 5-7, the split power path variator gearbox 62 includes a variator gearbox housing 64, which is assembled from a main housing piece 66 and a rear cover 68. The main housing piece 66 contains an inner chamber or cavity 70 (identified in FIG. 7), which is enclosed by the rear cover 68 when positioned against the main housing piece 66. The rear cover 68 may be attached to the main housing piece 66 utilizing fasteners (e.g., bolts) or in another manner allowing the rear cover 68 to be removed to access the inner cavity 70 for assembly and repair purposes. In further embodiments, the variator gearbox housing 64 can have a different form factor, part count, and construction, providing that the housing 64 is suitable for containing and supporting the internal components of the split power path variator gearbox 62.

When the split power path variator gearbox 62 is installed within a work vehicle drivetrain, the variator gearbox housing 64 may be mounted to the housing of a multi-speed transmission. An example of such a mounting arrangement is shown in FIG. 5 wherein the variator gearbox housing 64 is affixed to the housing of a multi-speed transmission 72, which may correspond to the multi-speed transmission 48 shown in FIG. 2. Additionally, a variator motor 74 (e.g., corresponding to the variator motor 42 of FIG. 2) may be mounted to the variator gearbox housing 64 opposite the multi-speed transmission 72. Various other mechanical, electrical, or fluid connections may also be provided to the split power path variator gearbox 62, to the multi-speed transmission 48, and to the variator motor 74, which are not shown in FIGS. 5-7 for clarity. For example, a non-illustrated lubricant supply line may be connected to a fitting-receiving feature 76 projecting from the rear cover 68 to allow lubricant (e.g., oil) flow into the inner cavity 70 and over the rotating components contained therein. During operation of the split power path variator gearbox 62, the lubricant may pool in a sump held in the bottom of the inner cavity 70 and be withdrawn through a lower opening 78 provided in the variator gearbox housing 64 for subsequent recirculation to the variator gearbox 62 by a drivetrain lubricant system.

As shown most clearly in FIG. 7, a planetary gear system 80 is contained within the variator gearbox housing 64. The planetary gear system 80 includes the following components: (i) a sun gear 82, (ii) a set of planet gears 84, (iii) a carrier 86, and (iv) a ring gear 88. The planet gears 84 are supported by the carrier 86 and angularly positioned around the sun gear 82. The sun gear 82 engages or meshes with the planet gears 84, which further engage or mesh with the toothed inner circumference of the ring gear 88. The planetary gear system 80 is rotatable about a planetary axis 90. The planetary gear system 80 may be supported by a number of rolling element bearings to facilitate rotation of the gear system 80 about the planetary axis 90. In the illustrated example, a number of rolling element (e.g., roller) bearings 116 support a tubular extension 92, which is fixedly coupled to the ring gear 88 and which extends from the ring gear 88 toward the variator motor 74. The tubular extension 92 and the ring gear 88 can be integrally formed as a single piece as shown in FIG. 7 or, instead, produced as separate pieces that are subsequently joined or connected to form a rotationally-fixed coupling.

As noted above, the variator motor 74 is affixed to the gearbox housing 64 in a cantilevered mounting. The variator motor 74 includes an I/O shaft 94, which extends into the inner cavity 74 of the variator gearbox housing 64 through an opening provided in the main housing piece 66. The variator motor I/O shaft 94 is rotatable about an axis that is substantially coaxial with the planetary axis 90 and, thus, also represented by the upper dashed line shown in FIG. 7. The variator motor I/O shaft 94 is mechanically coupled to the planetary gear system 80 through the sun gear 82. In the illustrated embodiment, and by way of example only, an elongated rotary coupling 96, 98 is provided between the variator motor I/O shaft 94 and the sun gear 82. The elongated rotary coupling 96, 98 includes an elongated rod or stem 96, which extends form the sun gear 82 toward the variator motor 74 and which is fixedly coupled to (e.g., integrally formed with) the sun gear 82). The elongated stem 96 is mechanically coupled to the variator motor I/O shaft 94 through a splined connector 98, which further forms the elongated rotary coupling 96, 98. The elongated rotary coupling 96, 98 thus extends within the channel or longitudinal opening provided through the tubular extension 92 to mechanically link the variator motor I/O shaft 94 to the sun gear 82.

The split power path variator gearbox 62 further includes a variator input shaft 100, which is rotatably about a primary path axis 102 (FIG. 7). The primary power path axis 102 is parallel to, but offset from the planetary axis 90. When the split power path variator gearbox 62 is installed within a work vehicle drivetrain system, the variator input shaft 100 is mechanically linked to the output of a prime mover, such as the output shaft of the engine 32 shown in FIG. 2. A splined adapter piece 104 may be joined (e.g., via a splined coupling) to a first end portion of the variator input shaft 100 to facilitate this connection between the engine 32 (or other prime mover) and the variator input shaft 100. The splined adapter piece 104 is accessible from exterior of the variator gearbox housing 64 and may include flanged portions having bolt holes, which can be bolted directly to the output shaft of the engine 32 or to an intervening shaft. At a second, opposing end portion, the variator input shaft 100 is further mechanically coupled to an auxiliary PTO shaft 106 (partially shown), which is also rotatable about the primary power path axis 102. The auxiliary PTO shaft 106 projects from the gearbox housing 64 in a direction opposite the first end portion of the variator input shaft 100 and variator motor 74. In an embodiment, the auxiliary PTO shaft 106 corresponds to the auxiliary PTO shaft 40 shown in FIG. 2. The variator input shaft 100 can be mechanically coupled to the auxiliary PTO shaft 106 utilizing a splined connector 108 or in another manner providing a rotationally-fixed coupling between the input shaft 100 and the PTO shaft 106. A number of rolling element bearings, such as ball bearings 110, facilitate rotation of the variator input shaft 100 and/or the auxiliary PTO shaft 106 about the primary power path axis 102.

A gear member 112 extends radially from an intermediate portion of the variator input shaft 100. The gear member 112 may be integrally formed with the variator input shaft 100 as a single piece or, instead, formed as a separate piece, which is coupled to the variator input shaft 100 in some manner. The gear member 112 includes an outer toothed periphery, which meshes with a toothed adapter piece 114 further disposed around and fixedly coupled to the ring gear 88. Specifically, the toothed adapter piece 114 may be affixed to the tubular extension 92, which is integrally formed with or otherwise fixedly coupled to the ring gear 88. The variator input shaft 100 is thus mechanically coupled to the planetary gear system 80 through the ring gear 88. Collectively, the variator input shaft 100 and the PTO shaft 106 provide a mechanical path through the split power path variator gearbox 62 for transmitting rotary motion from the prime mover (e.g., the engine 32 shown in FIG. 2) to the shaft-powered implements carried by the work vehicle, while a certain fraction of the power transmitted along this path is drawn-off and directed into the planetary gear system 80. This drawn-off power (again, abbreviated herein to as "$PO_{\%PM}$") may then be applied to the primary gearbox output (e.g., the below-described rotatable output member 118) or to the variator motor 74, depending upon whether the variator motor 74 is presently operating in a forward-driven or a reverse-driven mode.

As should be gathered from the foregoing description, the ring gear 88 serves as a first mechanical input of the planetary gear system 80, which receives a certain power input from the prime mover ($PO_{\%PM}$), such as the engine 32 of the work vehicle drivetrain 12 (FIG. 2), as drawn from the variator input shaft 100. By comparison, the sun gear 82 serves as a second mechanical input (and output) of the planetary gear system 80, which receives a power input from (and may also occasionally provide a power input to) the I/O shaft 94 of the variator motor 74. Finally, the carrier 86 serves as a mechanical output of the planetary gear system 80, which drives rotation of a rotatable output member 118 further included in the split power path variator gearbox 62. In the illustrated example, the rotatable output member 118 serves as the primary output of the split power path variator gearbox 62. Accordingly, the rotatable output member 118 may engage or otherwise be coupled to the mechanical input of the multi-speed transmission 72 shown in FIG. 5 when the split power path variator gearbox 62 is installed thereon. A coupler gear 120 is further provided to transmit rotary motion from the carrier 86, which rotates about the planetary axis 90, to the rotatable output member 118, which is rotatable about the primary power path axis 102. As can be seen in FIG. 7, the coupler gear 120 includes an elongated stem portion 122, which is fixedly-coupled (e.g., via a splined interface) to a central portion of the carrier 86. The coupler gear 120 further includes an outer toothed portion 124, which engages the outer toothed periphery of the rotatable output member 118. A number of rolling element bearings, such as ball bearings 126, are further disposed within the gearbox housing 64 and piloted to the coupler gear 120 to minimize friction as the gear 120 (and the various components of the planetary gear system 80) rotate about the planetary axis 90.

As previously noted, the split power path variator gearbox 62 permits the variator motor 74 to be selectively operated in forward-driven and reverse-driven modes. When the variator motor 74 is forward-driven, rotation of the variator motor I/O shaft 94 is transmitted to the planetary gear system 80 through the sun gear 82. Rotation of the sun gear 82 drives rotation of the planet gears 84, which travel along the toothed inner periphery of the ring gear 88. Concurrently, rotation of the ring gear 88 is driven by rotation of the variator input shaft 100 through the gear member 112 and toothed adapter piece 114. The rotational movement of the ring gear 88 (as powered by the prime mover or engine) is thus effectively summed with the rotation of the sun gear 82 (as powered by the variator motor) to drive rotation of the planet gears 84 and the carrier 86 about the planetary axis 90. Rotation of the carrier 86 is then transmitted through the coupler gear 120 to the rotatable output member 118 of the split power path variator gearbox 62. In this manner, the split power path variator gearbox 62 thus sums the power input received at the sun gear 82 ($PO_{VM}$) with the power input received at the ring gear 88 ($PO_{\%PM}$) and applies this summed power ($PO_{VM}+PO_{\%PM}$) to the work vehicle ground wheels through the carrier 86, the coupler gear 120, and ultimately the rotatable output member 118 of the split power path variator gearbox 62. When the split power path variator gearbox 62 is utilized as the variator gearbox 38 of the work vehicle drivetrain 12 (FIG. 2), the rotatable output member 118 may be mechanically coupled to the work vehicle ground wheels through the multi-speed transmission 48, as previously described.

When the variator motor 74 is reverse-driven, the excess power drawn from the prime mover (e.g., the engine 32 shown in FIG. 2) through the variator input shaft 76 is returned to the variator motor 74 via the planetary gear system 80. Specifically, the excess power drawn through the variator input shaft 76 is transmitted to the ring gear 88 through the gear member 112 and the toothed adapter piece 114. Rotation of the ring gear 88 drives rotation of planet gears 84, which, in turn, drive rotation of the sun gear 82. Rotation of the sun gear 82 is then transmitted to the variator motor I/O shaft 94 through the elongated stem 96 and splined connector 98. The motion imparted to the variator motor 74 is then temporary converted to stored energy, which can be subsequently utilized when the motor 74 is again operated in a forward-driven mode. By permitting reverse-driving of the variator motor 74 in this manner, the split power path variator gearbox 62 supports a regenerative functionality of the work vehicle drivetrain under certain operational conditions. In an embodiment, the split power path variator gearbox 62 may permit reverse-driving of the variator motor 74 during an initial speed range of selected gear ratio settings of a multi-speed transmission to provide a non-stepped or infinitely variable power output to the ground wheels, as described above in conjunction with FIG. 4. Advantageously, the split power path variator gearbox 62 provides such functionality in a relatively compact, structurally robust, and low part count package.

There has thus been provided multiple example embodiments of a highly efficient dual output work vehicle drivetrain, which is well-suited for cotton harvesters, sugarcane harvesters, and other work vehicles equipped with shaft-powered implements. In the above-described embodiments of the dual output work vehicle drivetrain, a prime mover (e.g., an engine) is utilized to drive rotation of an auxiliary PTO shaft and the shaft-powered implements, while further providing a baseline power output to the work vehicle ground wheels through a ground wheel output. A variator assembly, which includes a variator motor and a variator gearbox, contributes a controlled power output to the ground wheel output of the work vehicle over at least a portion the vehicle's working ground speed range. Such an arrangement advantageously allows the size and power requirements of the variator motor to be minimized to improve overall work vehicle efficiency. Additionally, in certain embodiments wherein the work vehicle drivetrain contains a multi-speed transmission, the dual output work vehicle drivetrain may be configured to at least partially compensate for the stepped nature of the transmission gear ratio settings and thereby yield an infinitely variable power output for powering the ground wheels over at least a majority and, possibly, the substantial entirety of the working ground speed range of the work vehicle. Embodiments of a split power path variator gearbox advantageously utilized within the dual output work vehicle drivetrain have also been provided.

While at least one example embodiment has been presented in the foregoing Detailed Description, it should be appreciated that a vast number of variations exist. It should also be appreciated that the example embodiment or example embodiments are only examples, and are not intended to limit the scope, applicability, or configuration of the invention in any way. Rather, the foregoing Detailed Description will provide those skilled in the art with a convenient road map for work implementing an example embodiment of the invention. It being understood that various changes may be made in the function and arrangement of elements described in an example embodiment without departing from the scope of the invention as setforth in the appended claims.

What is claimed is:

1. A work vehicle drivetrain, comprising:
   an engine;
   an auxiliary power takeoff (PTO) shaft coupled to the engine and rotatable about a primary power path axis when driven by the engine; and
   a variator assembly, comprising:
      a variator motor;
      a variator gearbox containing a planetary gear system coupled to the variator motor and to the auxiliary PTO shaft, the planetary gear system rotatable about a planetary axis substantially parallel and offset from the primary power path axis; and
      a primary gearbox output driven by the variator gearbox;
   wherein the variator gearbox is configured to sum to the primary gearbox output an output of the variator motor and an output of the engine when driving wheels of the work vehicle.

2. The work vehicle drivetrain of claim 1, wherein the variator motor comprises a variator motor shaft rotatable about an axis coaxial with the planetary axis.

3. The work vehicle drivetrain of claim 2, further comprising:
   a rotatable output member rotatable about the primary power path axis; and
   a coupler gear rotatable about the planetary axis and mechanically coupling the planetary gear system to the rotatable output member.

4. The work vehicle drivetrain of claim 3, wherein the rotatable output member has a longitudinal channel therethrough through which the auxiliary PTO shaft extends.

5. The work vehicle drivetrain of claim 1, further comprising a variator input shaft mechanically coupled between the engine and the planetary gear system.

6. The work vehicle drivetrain of claim 5, wherein the auxiliary PTO shaft is coupled to the variator input shaft in a rotationally-fixed relationship.

7. The work vehicle drivetrain of claim 5, wherein the planetary gear system comprises a first sun gear rotationally fixed to the variator input shaft.

8. The work vehicle drivetrain of claim 5 wherein the planetary gear system comprises:
   a set of planet gears;
   a carrier supporting the set of planet gears and serving as a mechanical output of the planetary gear system.

9. The work vehicle drivetrain of claim 5 wherein the planetary gear system comprises a ring gear through which the variator input shaft is coupled to the planetary gear system.

10. The work vehicle drivetrain of claim 9 further comprising:
    a tubular extension fixedly coupled to the ring gear and having a longitudinal channel therethrough; and
    an elongated rotating coupling extending within the longitudinal channel to mechanically couple the variator motor to the planetary gear system.

11. The work vehicle drivetrain of claim 1, wherein the work vehicle drivetrain is configured to be deployed onboard a work vehicle having a working ground speed range, and wherein the work vehicle further comprises:
    a transmission having a plurality of stepped gear ratio settings; and
    a controller operably coupled to the engine, to the transmission, and to the variator motor, the controller configured to control the variator motor to at least partially linearize the stepped gear ratio settings of the transmission.

12. The work vehicle of claim 11, wherein the controller controls the engine to remain substantially at a constant speed over at least a majority of the working ground speed range of the work vehicle.

13. A variator assembly for a work vehicle having an engine and ground-engaging wheels, comprising:
    a variator motor;
    a variator gearbox, comprising:
       a gearbox housing to which the variator motor is mounted;

a variator input shaft extending in the variator gearbox housing and rotatable with respect thereto about a primary power path axis; and a planetary gear system disposed within the variator gearbox housing, mechanically coupled to the variator motor and to the variator input shaft, and rotatable about a planetary axis substantially parallel to and offset from the primary power path axis; and a primary gearbox output driven by a variator gearbox;

wherein, when the variator assembly is coupled to the work vehicle, the variator gearbox is configured to sum to the primary gearbox output an output of the variator motor and an output of the engine when driving the ground-engaging wheels.

14. The variator assembly of claim 13, wherein the variator motor comprises a variator motor input/output (I/O) shaft rotatable about an axis coaxial with the planetary axis.

15. The variator assembly of claim 13, wherein the planetary gear system comprises:
a ring gear through which the variator input shaft is mechanically coupled to the planetary gear system; and
a sun gear through which the variator motor is mechanically coupled to the planetary gear system.

16. The variator assembly of claim 15, wherein the planetary gear system further comprises:
a set of planet gears engaging the ring and sun gears; and
a carrier supporting the set of planet gears and serving as a mechanical output of the planetary gear system.

17. The variator assembly of claim 16, further comprising:
a rotatable output member rotatable about the primary power path axis; and
a coupler gear rotatable about the planetary axis and mechanically coupling the carrier to the rotatable output member.

18. A variator gearbox for a work vehicle having an engine and ground-engaging wheels, comprising:
a gearbox housing;
a variator input shaft extending in the variator gearbox housing and rotatable with respect thereto about a primary power path axis;
a planetary gear system disposed within the variator gearbox housing and rotatable about a planetary axis substantially parallel to and offset from the primary power path axis; and
a primary gearbox output;
wherein, when the variator gearbox is coupled to the work vehicle, the planetary gear system is configured to sum to the primary gearbox output an output of a variator motor and an output of the engine when driving the ground-engaging wheels.

19. The variator gearbox of claim 18, wherein the planetary gear system comprises a ring gear through which the variator input shaft is mechanically coupled to the planetary gear system.

* * * * *

UNITED STATES PATENT AND TRADEMARK OFFICE
CERTIFICATE OF CORRECTION

PATENT NO. : 10,125,848 B2
APPLICATION NO. : 15/214347
DATED : November 13, 2018
INVENTOR(S) : Watt et al.

Page 1 of 1

It is certified that error appears in the above-identified patent and that said Letters Patent is hereby corrected as shown below:

On the Title Page

Item (74), Column 2, in "Attorney, Agent, or Firm", Line 2, delete "Wientrzny" and insert -- Wietrzny --, therefor.

In the Claims

In Column 17, in Claim 13, Line 9, delete "by a" and insert -- by the --, therefor.

Signed and Sealed this
Twenty-sixth Day of February, 2019

Andrei Iancu
*Director of the United States Patent and Trademark Office*